(12) United States Patent
Perotto et al.

(10) Patent No.: US 11,920,502 B2
(45) Date of Patent: Mar. 5, 2024

(54) TWIN-JET PISTON COOLING NOZZLE MADE OF PLASTIC MATERIAL

(71) Applicant: BONTAZ CENTRE R&D, Marnaz (FR)

(72) Inventors: Stephane Pacal Perotto, Ayse (FR); Julien Sixt, Seynod (FR); Maxime Sorin, Cluses (FR)

(73) Assignee: BONTAZ CENTRE, Marnaz (FR)

( * ) Notice: Subject to any disclaimer, the term of this patent is extended or adjusted under 35 U.S.C. 154(b) by 0 days.

(21) Appl. No.: 17/920,771

(22) PCT Filed: Apr. 21, 2021

(86) PCT No.: PCT/FR2021/050692
§ 371 (c)(1),
(2) Date: Oct. 21, 2022

(87) PCT Pub. No.: WO2021/214411
PCT Pub. Date: Oct. 28, 2021

(65) Prior Publication Data
US 2023/0243282 A1  Aug. 3, 2023

(30) Foreign Application Priority Data

Apr. 22, 2020 (FR) ...................................... 2003997

(51) Int. Cl.
*F01M 1/08* (2006.01)
*F01P 3/08* (2006.01)

(52) U.S. Cl.
CPC ................. *F01M 1/08* (2013.01); *F01P 3/08* (2013.01)

(58) Field of Classification Search
CPC ..................................... F01M 1/08; F01P 3/08
USPC ........................................... 123/41.34–41.37
See application file for complete search history.

(56) References Cited

U.S. PATENT DOCUMENTS

| | | | | |
|---|---|---|---|---|
| 4,979,473 A | * | 12/1990 | Lee ........................... | F01P 3/08 123/41.35 |
| 4,995,346 A | * | 2/1991 | Hudson, Jr. ............... | F01P 3/08 123/41.35 |
| 5,649,505 A | * | 7/1997 | Tussing .................... | F02F 3/22 123/41.35 |

(Continued)

FOREIGN PATENT DOCUMENTS

| | | |
|---|---|---|
| EP | 0423830 A | 4/1991 |
| EP | 3415736 A | 12/2018 |

(Continued)

*Primary Examiner* — Hai H Huynh
(74) *Attorney, Agent, or Firm* — H&I PARTNERS; Chai Im; C. Andrew Im

(57) ABSTRACT

A fluid nozzle element comprising a supply body with an attachment face and a bearing face opposite the attachment face and an axial passageway between the attachment face and the bearing face, the axial passageway communicating with a transverse opening provided in the supply body, further comprising a conduit structure communicating with the transverse opening extending laterally relative to the supply body to which it is connected by a first end, further comprising a free end forming a discharge end comprising a discharge port for discharging a fluid, the supply body and the conduit structure being comprised in a block made of a polymeric material.

14 Claims, 7 Drawing Sheets

(56) References Cited

U.S. PATENT DOCUMENTS

| | | | | |
|---|---|---|---|---|
| 5,881,684 A * | 3/1999 | Bontaz | ............ | F01P 3/08 |
| | | | | 123/41.35 |
| 5,917,418 A * | 6/1999 | Han | ............ | F01M 11/10 |
| | | | | 340/439 |
| 6,672,261 B1 * | 1/2004 | Svensson | ............ | F01P 3/08 |
| | | | | 123/41.35 |
| 7,086,354 B2 * | 8/2006 | Dunbar | ............ | F01P 3/10 |
| | | | | 123/41.35 |
| 7,240,643 B1 * | 7/2007 | Perr | ............ | F01P 3/08 |
| | | | | 123/41.35 |
| 8,122,859 B2 * | 2/2012 | Phelps | ............ | F01P 3/08 |
| | | | | 123/41.35 |
| 10,125,661 B2 * | 11/2018 | Clement | ............ | F16K 25/00 |
| 2004/0040520 A1 * | 3/2004 | Bontaz | ............ | F01P 3/08 |
| | | | | 123/41.35 |
| 2005/0098122 A1 * | 5/2005 | Bontaz | ............ | F01P 3/08 |
| | | | | 123/41.35 |
| 2010/0095910 A1 * | 4/2010 | Phelps | ............ | F01M 1/08 |
| | | | | 123/41.35 |

FOREIGN PATENT DOCUMENTS

| | | | |
|---|---|---|---|
| KR | 20040041430 A | | 5/2004 |
| WO | 2018164878 A | | 9/2018 |

* cited by examiner

TWIN-JET PISTON COOLING NOZZLE MADE OF PLASTIC MATERIAL

RELATED APPLICATIONS

This application is a § 371 application of PCT/FR2021/050692 filed Apr. 21, 2021, which claims priority from French Patent Application No. 20 0995 filed Apr. 22, 2021, each of which is incorporated herein by reference in its entirety.

FIELD AND BACKGROUND OF THE INVENTION

The present invention relates to the field of fluid nozzles in particular in a cooling device for an engine and provides an improved nozzle as well as a method for manufacturing such a nozzle.

A piston cooling nozzle of an internal combustion engine allows a cooling fluid such as oil to be sprayed onto at least one appropriate zone of a piston.

Piston cooling nozzles are usually formed by inserts attached to a crankcase and communicating with a cooling fluid delivery port. The position of the cooling nozzle is precisely determined to provide a jet of cooling fluid directed to a precise zone in the piston top or to a piston gallery inlet.

A piston cooling nozzle as implemented by the applicant is illustrated in FIGS. 1A, 1B, 1C (showing a view of the piece from two distinct and parallel section planes).

It is comprised of a hollow metal supply body 1 and a metal tube 2, typically made of steel, fitting into the hollow body 1 and communicating with a fluid passageway 4 made in the hollow body 1. The tube 2 may be terminated by a metal end cap 3. The end cap 3 has perforations 6 to allow oil to exit.

The supply body 1, tube 2 and end cap 3 are typically made of steel which can make them difficult to machine and can cause weight issues.

Typically, the tube 2 is assembled to the hollow body 1 by soldering. The end cap 3 is also shrunk on and assembled to the metal tube 2 by soldering.

The repeatability of the assembly to ensure uniformity of size and operation of the nozzle raises a problem. Moreover, assembly by soldering can be expensive.

The problem arises of making a new nozzle structure which is improved with respect to at least one of the above-mentioned drawbacks.

SUMMARY OF THE INVENTION

One embodiment of the present invention provides for a fluid nozzle piece or element, in particular a cooling fluid nozzle, said piece or element including a supply body provided with a so-called "attachment" face and a so-called "bearing" face opposite to the attachment face, as well as an axial passageway between said attachment face and said bearing face, said axial passageway communicating with a transverse opening provided in said supply body, said element or said piece further including a conduit structure communicating with said transverse opening, the conduit structure being connected by a first end to said supply body, said conduit structure extending laterally relative to said supply body and including a free end forming a discharge end fitted with one or more discharge ports for discharging said fluid, said supply body and said conduit structure being formed of a single block based on a plastic material and/or a polymer.

Such a piece has a reduced weight and cost compared to a mechanically welded nozzle. It reduces the number of components to be assembled to make this nozzle.

Making the supply body and the conduit structure of a single block of plastic material makes it possible to obtain precise dimensioning of the piece as well as precise positioning of the fluid discharge ports in the piece, in particular in comparison with a nozzle in which the discharge is ensured by an end cap assembled and brazed onto a tube whose correct orientation has to be controlled.

Typically, the fluid nozzle is a cooling nozzle for an engine, in particular an internal combustion engine.

Advantageously, the nozzle may further comprise at least one attachment member configured to attach said supply body to a fluid supply device.

The nozzle may be provided with a regulation element for regulating fluid access in said conduit structure such as a valve and/or a flap.

Particularly advantageously, the attachment member and the regulation element are achieved by a flap screw housed in said axial passageway.

According to one particular embodiment, between the flap screw and said supply body, a metal insert is provided housed in said axial passageway, said metal insert including an outer surface bearing against an inner wall of said supply body, said metal insert being provided with a side through hole communicating with said transverse opening.

According to one advantageous embodiment, the metal insert may be fitted with a positioning structure, in particular a flat land, configured to be placed on a positioning element of an inner wall of the supply body. The positioning element may be similar to the positioning structure of the insert or complementary to the positioning structure of the insert.

According to one possible implementation, the nozzle may be fitted with an attachment plate made of a metal material and/or of higher rigidity than said plastic material, said attachment plate being arranged on said attachment face of said supply body.

An attachment member, for example a hollow screw or a flap screw provided with a shoulder may be used. Advantageously, this shoulder is configured to abut against an attachment plate.

According to one possible embodiment of the nozzle, the latter may furthermore be provided with: a seal interposed between a head of said flap screw or hollow screw and said bearing face of said supply body.

The conduit structure may be provided with a fluid channel having one end communicating with said transverse opening and another end communicating with several fluid discharge ports having different orientations.

Making the conduit structure of plastic material allows different shapes of ports to be easily achieved, which can bring a gain in performance of the fluid jet, in particular a better useful flow rate and a better spray precision.

Advantageously, said one or more fluid discharge ports have a polygon-shaped transverse cross-section or a cross-section in the form of a succession of curved portions forming a closed contour.

According to another aspect, the present invention relates to a piston cooling device of an internal combustion engine comprising a fluid nozzle as previously defined.

According to another aspect, the present invention relates to an internal combustion engine including:

an engine block and pistons slidably mounted in said engine block, a cooling device as defined above.

According to another aspect, the present invention relates to a method for manufacturing a fluid nozzle element as defined above, the method comprising a step of molding said block of plastic and/or polymeric material, in particular injection molding.

Such a method allows the nozzle to be manufactured rapidly with good dimensional repeatability of the piece forming the supply body and conduit, allows the number of assembly operations to be limited compared to a mechanically welded nozzle, and allows more complex shapes of the fluid outlets to be produced than in a metal piece.

According to one particular embodiment, molding can be performed in such a way as to overmold said plastic block onto a metal plate on said attachment face.

According to an advantageous aspect of the method, the mold used in the molding step is provided with a shank and one or more shafts of respective complementary shapes of discharge ports and of a channel in the conduit structure respectively.

According to another aspect, the present invention relates to a method for manufacturing a fluid nozzle as defined above.

BRIEF DESCRIPTION OF THE DRAWINGS

The present invention will be better understood using the following description and the appended drawings in which.

The various parts represented in the figures are not necessarily represented in a uniform scale, in order to make the figures more legible.

Furthermore, in the following description, terms that depend on the orientation of a structure such as "front", "top", "back", "bottom", "side", apply when considering that the structure is oriented as illustrated in the figures.

DETAILED DESCRIPTION

Figure 1A:
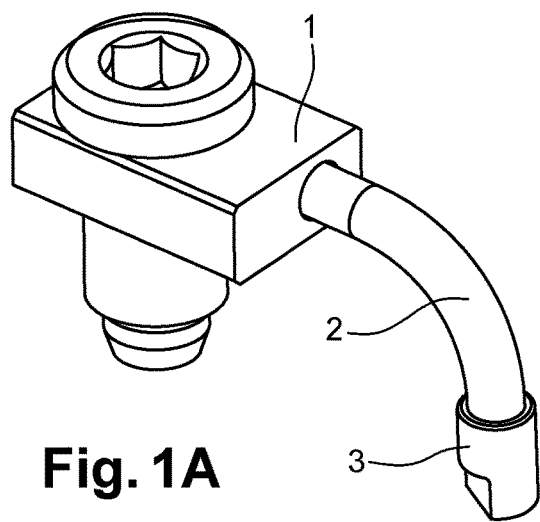
FIGS. 1A, 1B, 1C show perspective and cross-sectional views of a conventional metal nozzle formed by assembling metal pieces by soldering.
Figure 1B:
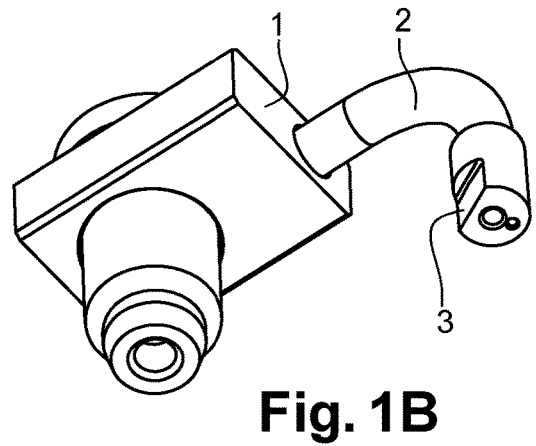
Figure 1C:
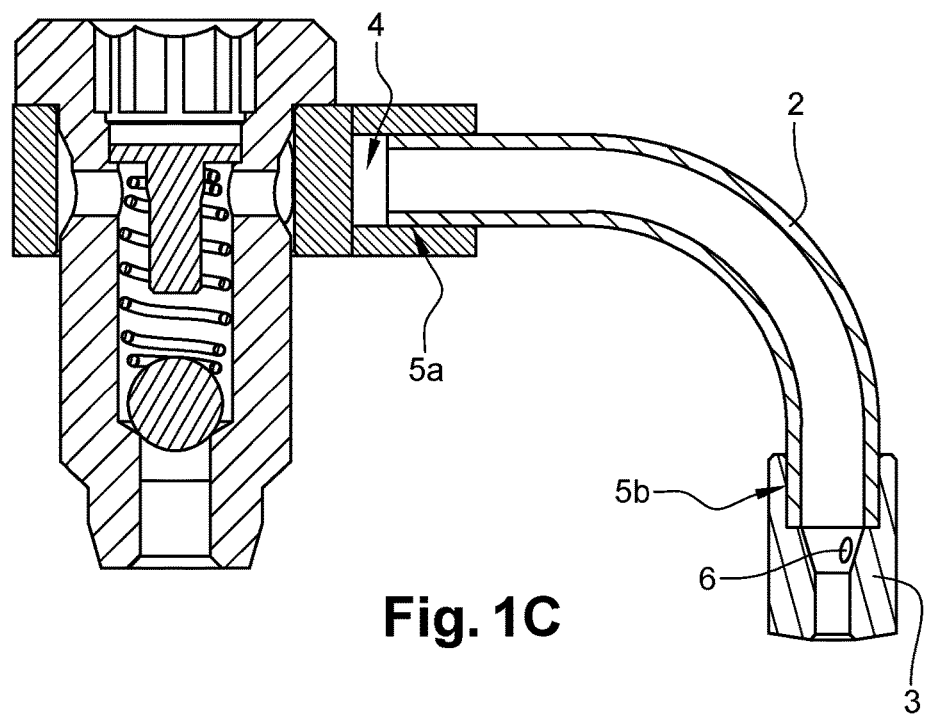
Figure 2A:
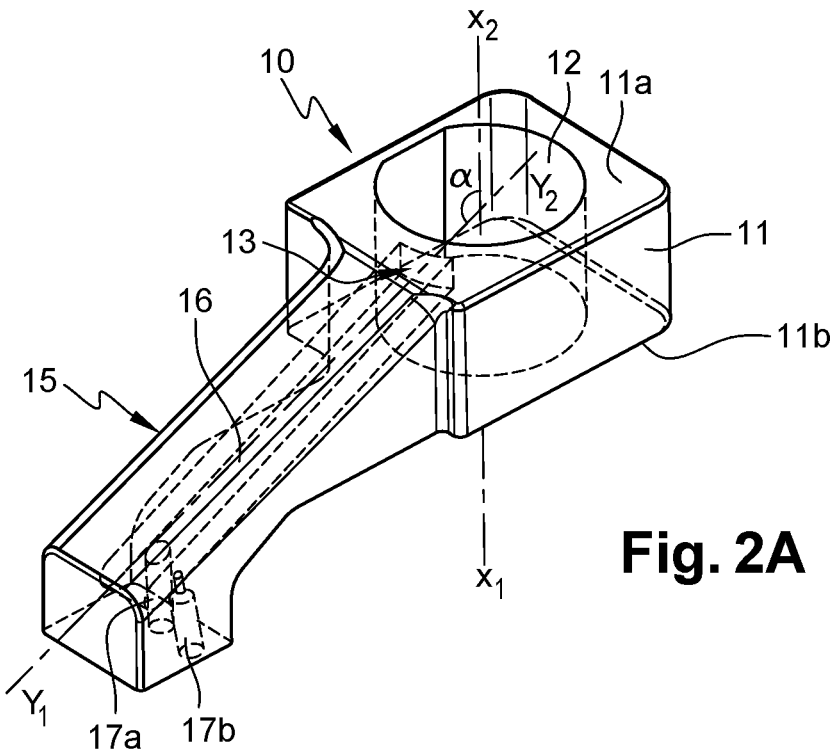
FIGS. 2A, 2B show a perspective view and a bottom view of a piece made of plastic material forming the supply body and discharge conduit of a nozzle according to the present invention
Figure 2B:
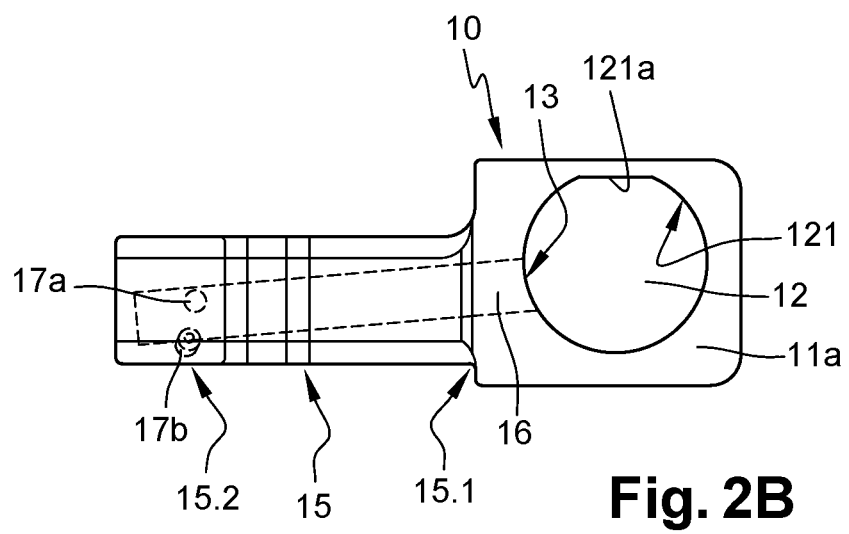

In FIGS. 2A-2B (showing a 3-dimensional view and a bottom view, respectively), an example embodiment of a piece 10 of a fluid nozzle according to an embodiment of the present invention is shown.

The nozzle may in particular be a nozzle for a cooling fluid such as oil and intended to spray this fluid onto one or more piston zones of a combustion engine.

The piece 10 includes a part 11, in this example of parallelepiped shape, called "supply body", to be connected to a fluid supply device (not represented). A so-called "attachment" face 11b can thus be added against this fluid supply device, for example against a crankcase intended to transmit the cooling fluid.

The supply body 11 is hollow and includes an inner axial passageway 12 which extends here from the attachment face 11b to a so-called "bearing" face 11a opposite to the attachment face 11a. The axial passageway 12 delimited by at least one inner wall 121 of the supply body 10 communicates with a transverse opening 13 made in this inner wall 121. The fluid is made to enter into the piece 10 on the attachment face 11b side of the supply body 11, pass through the axial passageway 12 and then pass through the transverse opening 13.

The piece 10 is provided with another elongated or oblong part 15, called "conduit structure", which is connected by a first end 15.1 to the supply body and extends from a side face of the supply body to a free end 15.2 forming a fluid discharge end. The fluid is discharged through at least one fluid discharge port provided in the free end 15.2 of the conduit structure.

The piece 10 has the feature of being as one-piece, that is, with a conduit structure and a supply body formed of a single piece. A one-piece design provides advantages in terms of dimensional and functional repeatability over a nozzle that is an assembly of several components, typically a supply body and a fluid tube, to which a discharge end cap may be added.

The piece 10 is typically made of at least one plastic material or at least one polymer material, which makes it economical, saves weight and facilitates one-step production, for example by molding. A polymer filled with glass fibers or reinforcements can also be used.

Preferably, the plastic material is chosen to withstand thermal cycles between −40° C. and 140° C. The plastic material can be, for example, a polyamide such as PA66 or PA6-6T, a polyphthalamide (PPA), a Polyphenylene Sulphide (PPS).

Another criterion is its compatibility with the fluid used. For example, when this fluid is a cooling oil, a plastic material chemically resistant to this oil is chosen.

A multi-material plastic piece 10 with, for example, a zone made of a softer plastic material than another zone made of a different plastic material can also be provided.

With a one-piece plastic piece 10, one or more soldering operations are moreover avoided, as is the case when a nozzle is produced according to prior art by assembling a supply body, a fluid tube and possibly a discharge end cap.

Advantageously, a flexible plastic material can be used, in order to obtain a better endurance of the piece 10. In this case, the material may be an unfilled glass fiber polymer.

In the example illustrated, the conduit structure 15 includes a channel 16 which communicates with the transverse opening 13 and opens into several fluid discharge ports 17a, 17b. After passing through the supply body 11 and the transverse opening 13, fluid is made to pass through the channel and then discharged from the piece 10 through the ports 17a, 17b.

According to one possible embodiment shown in FIG. 2A, the conduit structure may be provided with a rectilinear channel 16 which extends in a direction Y1Y2 making an angle α different from 90°, for example greater than 90° relative to the main axis X1X2 of the passageway 12. The axis X1X2 is in this particular example normal to the attachment face 11b.

The ports 17a, 17b advantageously have different orientations to each other and to the channel 16. This allows fluid to be discharged to separate targets. For example, in the case of a coolant nozzle, this allows cooling of different zones of a piston mechanism. The piston cooling nozzle can be designed for example to perform two functions, cooling the piston through a piston gallery and lubricating a piston/connecting rod axis.

The use of plastic material to make the piece 10 moreover offers the possibility to easily provide different configurations and shapes of the discharge ports 17a, 17b and/or channel 16.

An attachment member (not represented in FIGS. 2A-2B) is intended to be inserted into the axial passageway 12. This attachment member, for example formed by a hollow screw or a flap screw is typically configured to attach the supply body 11 to the fluid supply device (not represented) while allowing a fluid flow from the axial passageway 12 to the transverse opening 13. In particular, the attachment member may be provided to hold the attachment face 11b of the piece 10 against the fluid supply device (not represented) or a bracket itself disposed against the fluid supply device.

Figure 3:
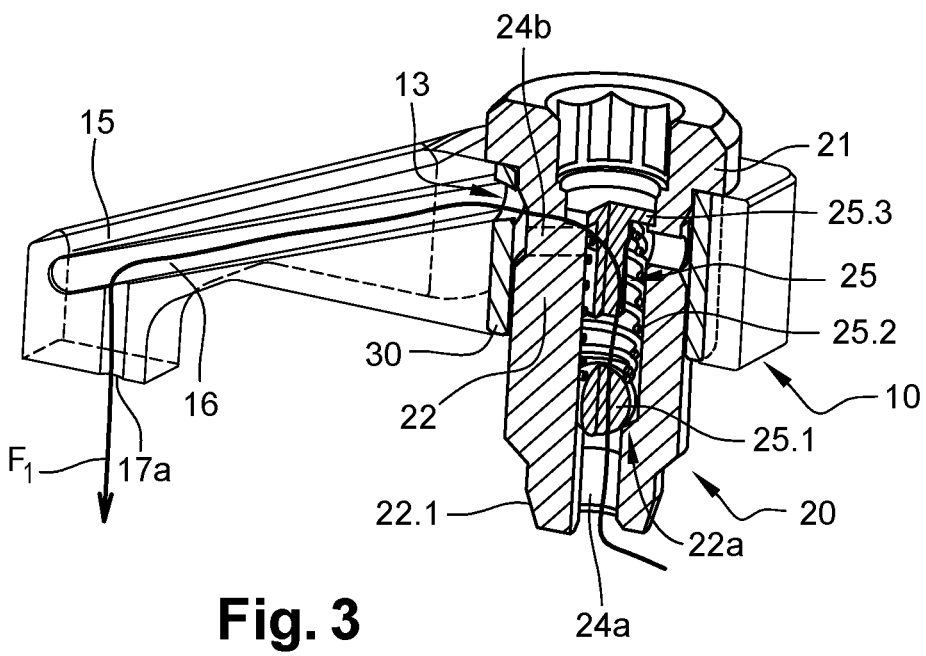
FIG. 3 is a cross-sectional view of an assembly of the plastic piece and a flap screw

In the particular embodiment illustrated in FIG. 3, the attachment member is a hollow screw 20 including a head 21 arranged against and here in contact with the bearing face 11b of the piece 10. The screw 20 includes a hollow threaded shank 22 as an extension of the head 21 and which is housed in the axial passageway 12. The hollow shank 22 includes a part 22.1 which projects from the attachment face 11b. This part 22.1 may be intended, for example, to engage a bore in the fluid supply device, for example a pipe or oil sump of an engine block. This part 22.1 is optional.

To allow the fluid passage, at least one axial cavity 24a extending in the shank 22 opens at one end onto the fluid supply device. As an extension of the axial cavity 24a, the shank 22 of the screw 20 includes a radial cavity 24b likely to be brought into communication with the transverse opening 13 of the piece 10.

In the particular example embodiment shown in FIG. 3, a flap screw 20 is advantageously used which furthermore provides a function of regulating the access of fluid into the conduit structure 15 of the piece 10. A pressure-sensitive shut-off flap 25 configured to alternately block fluid access to the conduit structure 15 of the piece 10 and allow fluid access to the conduit structure 15 of the piece 10 depending on the fluid pressure is here provided in the hollow part of the screw 20.

In the particular example illustrated in FIG. 3, the flap 25 may be formed of at least one closure element 25.1 for example in the form of a ball capable of closing a section of the axial cavity 22a. The closure element 25.1 is arranged against a spring 25.2 bearing against a cover 25.3 and is provided to close another section of the axial cavity 22a and block a fluid passage to the transverse opening 13 of the piece 10, in particular as long as the fluid pressure is below a given pressure threshold. Other types of flap screw, for example a flap screw including a piston as a closure element, may also be used.

The operation of the nozzle can then be as follows: under a certain fluid pressure, for example when an engine oil pressure exceeds a given threshold, a displacement of the ball 25.1 causes the valve to move to an open position. The fluid exits through the radial cavity 24b, which itself communicates with the transverse opening 13 of the piece 10, to the main channel 16 of this piece 10 and finally exits through the outlet ports 17a, 17b present at the free end 15.2 of the conduit structure 15.

Although FIG. 3 shows a closed position of the flap preventing fluid flow in the conduit structure 15, the fluid path adopted when this flap is in the open position is schematically represented with an arrow F1.

As an alternative to the example illustrated in FIG. 3, it is possible to provide the nozzle with an attachment member of the hollow screw type through which the fluid is intended to pass, without necessarily providing an integrated closure element or flap. In this case, the control of the fluid inlet in the conduit structure 15 can be offset out of the piece 10 through another structure, for example a solenoid valve external to the screw and to the piece 10. Alternatively, for some applications, a nozzle without a closure means may be provided which is capable of preventing fluid flow from a fluid supply device to the conduit structure 15.

In order to improve the attachment of the piece 10 made of plastic material by the attachment member at least partly made of metal, a metal insert 30, for example made of steel, can be provided in the passageway 12 against the inner wall 12.1, and is arranged between this inner wall 121 and the attachment member. The insert 30 also ensures that the screw head is centered and that the nozzle is correctly positioned.

Figure 4A:
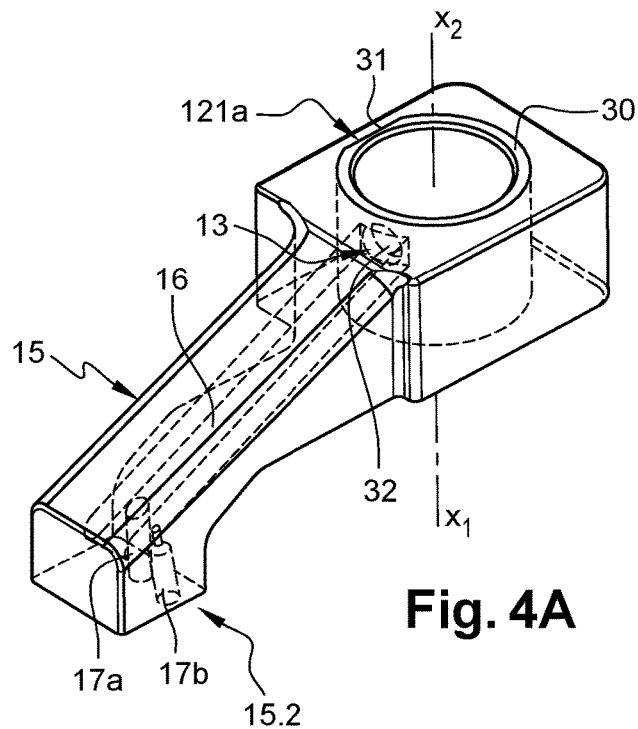
FIGS. 4A, 4B show a perspective view and a bottom view of a particular example embodiment of the nozzle in which a metal insert is mounted on the piece made of plastic material
Figure 4B:
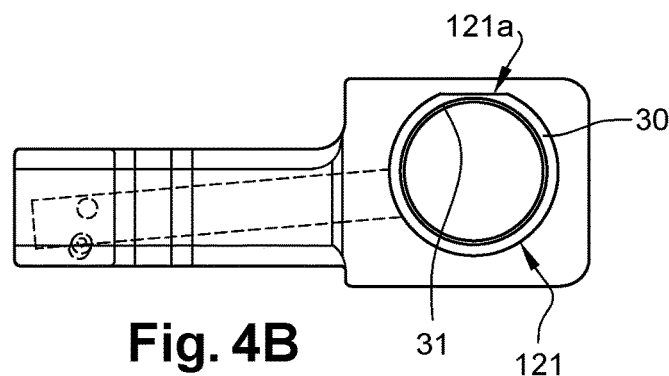

In FIGS. 4A-4B, showing respectively a 3-dimensional view and a bottom view of the piece 10 without an attachment member, the metal insert 30 can be seen housed in said axial passageway 12. In this example, the insert has a cylindrical tube appearance. In order to allow the fluid passage to channel 16, the metal insert 30 housed in said axial passageway includes a side hole 32 passing through its wall and communicating with said transverse opening 13. To ensure proper orientation of the insert side hole 32 with the transverse opening 13 leading to the channel 16, a positioning structure may be provided on the insert 30. The positioning structure may be arranged on a positioning element of the inner wall 121 of the supply body 11. In the example illustrated, the positioning structure is a flat land 31 arranged against a corresponding flat 121a or a corresponding planar zone 121a of the inner wall 121 of the supply body 11. The flat land is a simple means of ensuring the orientation of the hole 32 relative to the transverse opening 13 and thus ensures that the hole 32 and the transverse opening 13 communicate fully to ensure the fluid passage in a zone of controlled diameter. Alternatively, other means may be provided to enable rotation to be prevented, such as a groove along an axis parallel to the axis X1X2 or a hexagonal cross-section.

Figure 4C:
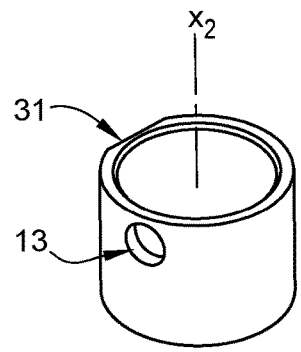
FIG. 4C shows a perspective view of the metal insert

The insert 30, which can be seen in isolation in FIG. 4C, is typically force-fitted into the passageway 12 of the plastic body 11.

Figure 5:
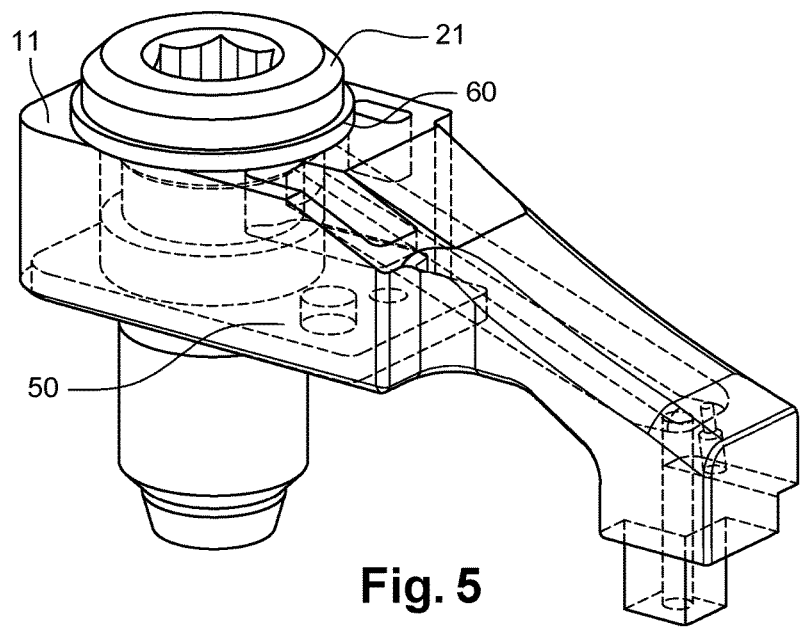
FIG. 5 is a perspective view of a particular example embodiment of a nozzle in which a seal is provided between the head of an attachment member and a face of the piece made of plastic material
Figure 6A:
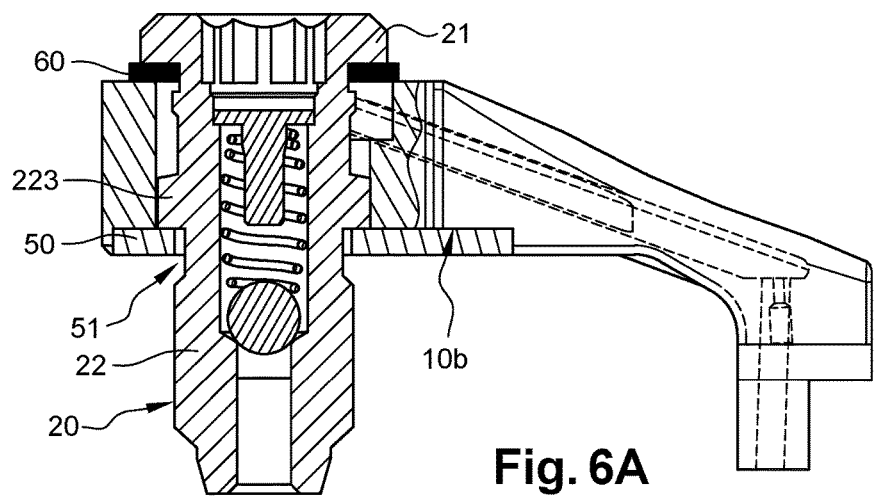
FIGS. 6A, 6B show respectively a cross-sectional view of an example embodiment of a nozzle in which the plastic piece is overmolded onto a rigid attachment plate, and a perspective view of the attachment plate alone.
Figure 6B:
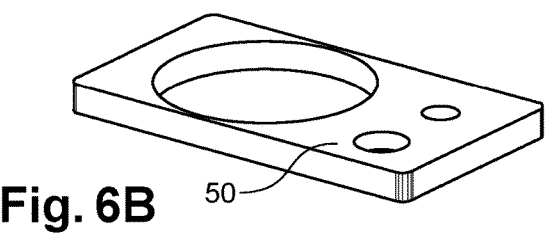

A further example of embodiment to enable improved attachment of the piece 10 is shown in FIGS. 5 and 6A-6B.

In order to limit contact pressure exerted by the attachment member on the fluid supply device to which the piece 10 is attached, a rigid openwork attachment plate 50 disposed against said attachment face 10b of said supply body 11 may be provided. This attachment plate 50 is made of a material having a higher rigidity than the constituent material of the piece 10. Typically, the attachment plate 50 is made of metal, for example steel.

In this case, the attachment member, in particular the screw or flap screw 20, made to pass through a hole 51 in the plate 50 may be provided with a shoulder 223 configured to abut against said attachment plate 50. The tightening force is then applied to the plate 50 rather than to the fluid supply device or engine block.

The rigid plate 50 may also be added to the plastic piece 10 to ensure interchangeability of the nozzle and to enable the nozzle to be attached to a metal bracket of a fluid supply device.

For example, such a plate 50 may allow the plastic piece 10 to be fitted to an engine block made of a ductile material such as an aluminum alloy on which a metal nozzle is usually installed. Too much contact pressure on an engine block made of such a material when the screw is tightened can cause plastic deformations that are to be avoided on the part of the engine block in contact with the screw. The plate 50 added between the shoulder 223 of the screw 20 and the engine block (not represented) makes it possible to distribute the tightening force over a larger surface area, thus reducing the contact pressure and finally avoiding deformation of the engine block when assembling the nozzle in the engine.

In addition to an opening for the passage of an attachment member, the plate 50 may be provided with at least one hole or at least one protruding element such as a pin to make the assembly with the supply body 11 more robust, the latter then being provided with a corresponding pin or a corresponding hole.

The plate 50 may also be provided with at least one hole or at least one protruding element such as a pin to allow the nozzle to be correctly oriented relative to the fluid supply device or an engine block.

Moreover, as shown in FIGS. 5 and 6A, to improve the assembly, a seal 60, for example in the form of a flat openwork disk, may be provided between the head 21 of the screw 20 and the bearing face 11a of the body 11. The seal 60 may be, for example, a fluorocarbon elastomer.

When the nozzle is subjected to high thermal stresses, the seal 60 can also compensate for the differences in expansion between the body 11 made of plastic and the screw 20, which is typically made of metal. This ensures the correct positioning of the attachment element, which also performs a function of fluid channel. The seal 60 can also be used to ensure sealing. In particular, the seal 60 added under a screw 20 head makes it possible to guarantee sealing over the entire temperature range of use of the nozzle.

In the particular embodiment shown in FIGS. 5 and 6A, the assembly is provided with the attachment plate 50 but without an insert, which may reduce the cost of the nozzle. FIG. 6B shows a view of the plate 50 in isolation.

As an alternative, in particular to guarantee a certain level of robustness, an assembly with both the attachment plate 50 and the metal insert 30 described above can be made.

According to another alternative, an assembly can be made without an attachment plate 50 but with a screw including a shoulder 223 as illustrated in FIG. 6A.

The use of a plastic material to make the conduit structure described above and provided with at least one discharge port 17a for discharging fluid out of the nozzle, also makes it easier to achieve different port shapes (FIGS. 7A-7E).

Figure 7A:
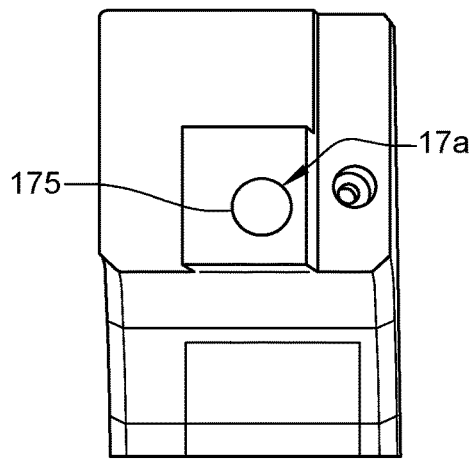
FIGS. 7A, 7B, 7C, 7D, 7E show different shapes of fluid discharge ports provided in the plastic piece forming the supply body and discharge conduit of a nozzle

Apart from a port with a circular cross-section 175 shown in FIG. 7A, ports with a polygonal transverse cross-section or with several curved faces can be provided. This cross-section affects the desired jet quality and jet velocity at the nozzle outlet. It can also be adapted according to the amount of fluid for a given time, also known as the useful flow rate, that is intended to be sprayed onto a target zone, for example a piston to be cooled.

Figure 7B:
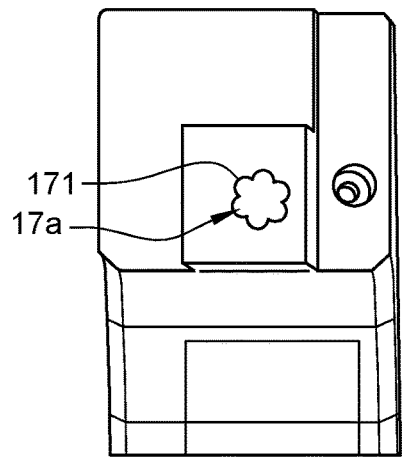
Figure 7C:
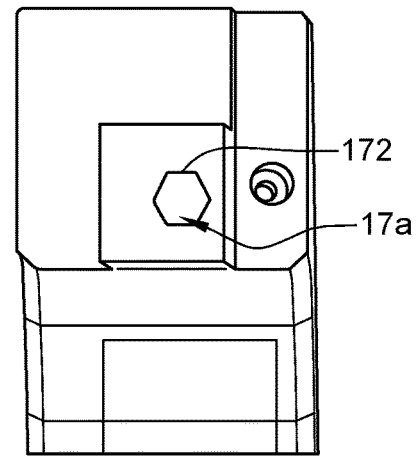
Figure 7D:
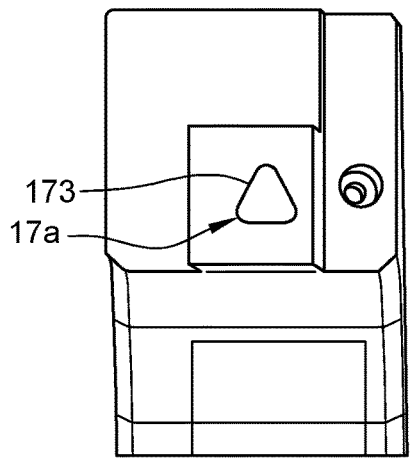
Figure 7E:
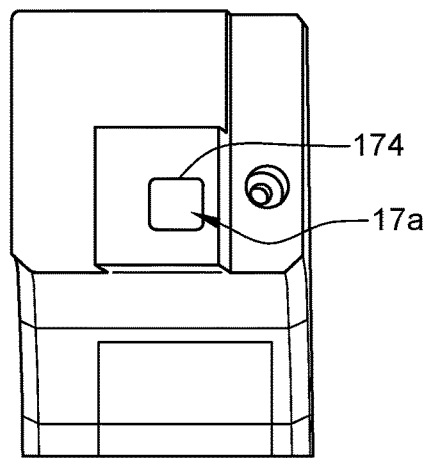

In the example shown in FIG. 7B, the transverse cross-section 171 of the port 17a is formed by a succession of curved portions, for example circular, making a closed contour. In FIG. 7C, the port 17a has a polygonal, in particular a hexagonal, cross-section 172 while a triangular 173 or a rectangular 174, in particular a square cross-section, are provided on the discharge ports 17a shown in FIGS. 7D and 7E respectively. Such shapes for creating zones for accelerating the fluid jet may be provided.

An example method for manufacturing a fluid nozzle according to the invention will now be described.

In a first step, the piece 10 shown in FIGS. 2A-2B is formed by molding, for example of a plastic or a polymeric material. The supply body and the conduit structure are made of a single piece and in one operation. In particular, an injection molding method may be implemented.

Figure 8:
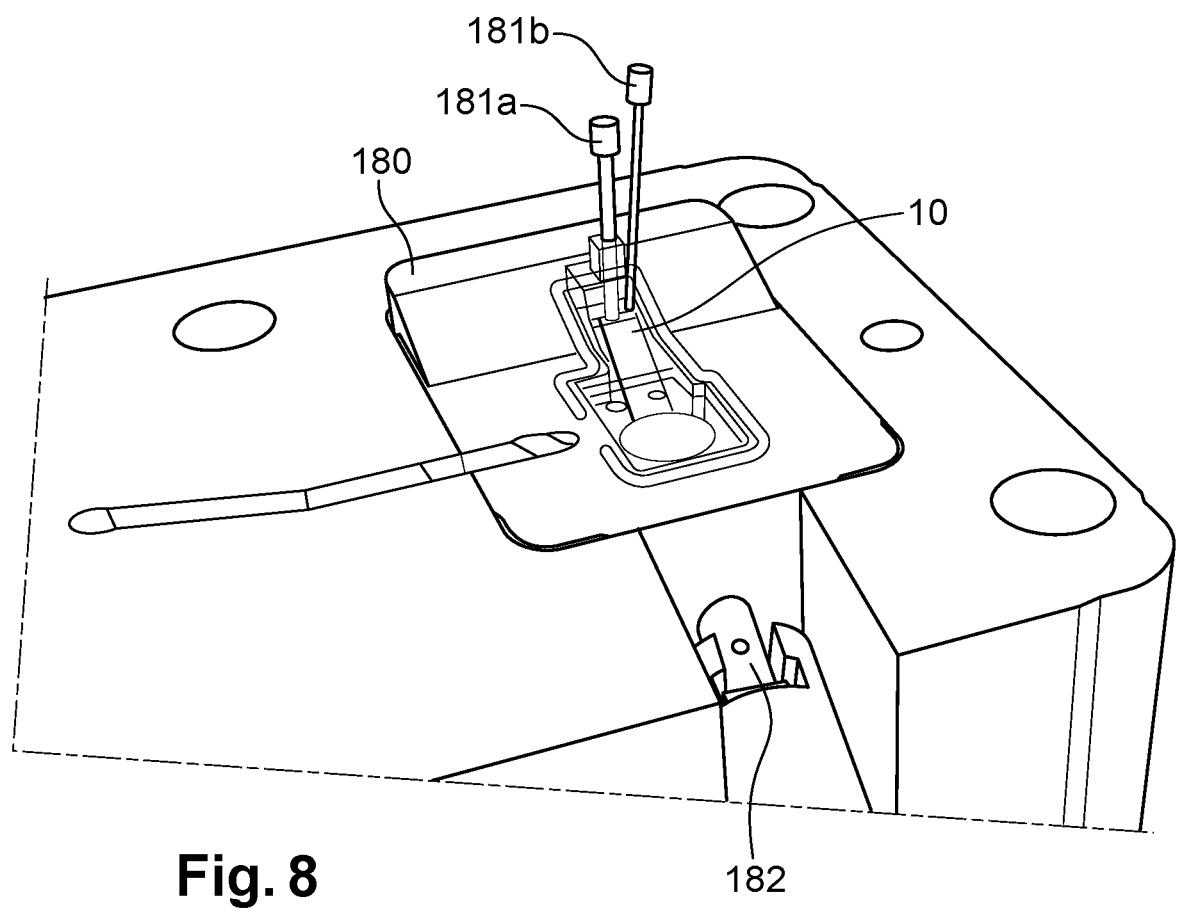
FIG. 8 shows a view of a device for molding the nozzle plastic piece.

At least one thermoformable polymer-based material, for example such as PA66, or PA6-6T, or PPA, or PPS can be used. This material is first softened by the application of heat and then injected into a mold and cooled. For example, a mold 180 as illustrated in FIG. 8 may be used.

In order to allow the fluid discharge ports 17a, 17b, the transverse opening 13 and the channel 16 of the piece 10 to be formed in a single operation, the mold may be especially provided with shafts 181a, 181b of a shape complementary to that of the fluid discharge ports 17a, 17b and with a shank 182 of a shape complementary to that of the channel 16 which penetrate into the material to be structured. The passageway 12 is typically made during this same operation.

Advantageously, molding of several polymer or plastic materials can be performed to make the nozzle piece.

When a nozzle 10 is provided with an attachment plate 50 as illustrated in FIGS. 6A and 6B, the piece 10 can be overmolded onto this plate 50 during the molding operation. Thus, a solid assembly can be achieved between the plastic piece 10 and an attachment plate made of a different material, for example steel.

Once the piece 10 has been formed, in a case where an insert 60 as illustrated in FIGS. 4A-4B is provided, this insert is force-fitted into the passageway 12 of the supply body.

Assembly of the nozzle to a fluid supply device is then achieved by introducing the attachment member, typically a hollow screw or flap screw into the passageway 12.

As previously indicated, the piece 10 made of plastic material and various assemblies described above are especially intended to form an engine cooling device in order to spray a cooling fluid such as oil into one or more target zone(s) of a piston mechanism of an engine.

Such a piece and such assemblies may also find applications in other types of devices, for example in a hydraulic or pneumatic device, of an automobile vehicle, in particular in a hydraulic circuit of an internal combustion engine or for example for spraying a lubricating oil onto a chain or for a cooling nozzle of an electric motor for an electric vehicle.

The invention claimed is:

1. A fluid nozzle element comprising a supply body comprising an attachment face and a bearing face opposite the attachment face and an axial passageway between the attachment face and the bearing face, the axial passageway communicating with a transverse opening provided in the supply body, further comprising a conduit structure communicating with the transverse opening, the conduit structure extending laterally relative to the supply body and being connected to it by a first end and comprising a free end comprising a discharge port for discharging a fluid,
  the supply body and the conduit structure being comprised in a block made of a polymeric material, and
  the fluid nozzle element further comprising an attachment plate made of a metallic material having a rigidity higher than a rigidity of the polymeric material, the attachment plate being assembled to the attachment face.

2. The fluid nozzle element of claim 1, further comprising a metal insert housed in the axial passageway and comprising an outer surface bearing against an inner wall of the supply body, the metal insert comprising a side hole passing through and communicating with the transverse opening.

3. The fluid nozzle element of claim 2, wherein the metal insert comprises a positioning structure configured to be placed on a positioning element of the inner wall.

4. The fluid nozzle element of claim 3, wherein the positioning structure is a flat land of the metal insert, and the positioning element is a planar zone of the inner wall.

5. The fluid nozzle element of claim 1, comprising a plurality of discharge ports and wherein the conduit structure comprises a fluid channel having one end communicating with the transverse opening and another end communicating with the plurality of discharge port, the discharge ports of the plurality having different orientations.

6. The fluid nozzle element of claim 1, wherein the discharge port is of a polygonal transverse cross-section.

7. The fluid nozzle element of claim 1, wherein a cross-section of the discharge port is of a contour comprising a succession of curved portions providing a closed contour.

8. The fluid nozzle element of claim 1, comprised in a fluid nozzle assembly, the fluid nozzle assembly comprising at least one attachment member for attaching the supply body to a fluid supply device.

9. The fluid nozzle element of claim 1, comprised in a fluid nozzle wherein the fluid nozzle comprises a regulation element adapted to regulating a fluid access into the conduit structure.

10. The fluid nozzle element of claim 1, comprised in a fluid nozzle wherein the fluid nozzle comprises a flap screw housed in the axial passageway.

11. The fluid nozzle element of claim 10, wherein the flap screw comprises a shoulder configured to abut against the attachment plate.

12. The fluid nozzle element of claim 10, further comprising a seal interposed between a head of the flap screw and the bearing face.

13. The fluid nozzle element of claim 10, comprised in a piston cooling device of an internal combustion engine, the internal combustion engine comprising an engine block and pistons slidably mounted in the engine block.

14. A fluid nozzle element comprising a supply body comprising an attachment face and a bearing face opposite the attachment face, and an axial passageway between the attachment face and the bearing face, the axial passageway communicating with a transverse opening provided in the supply body, the fluid nozzle element further comprising a conduit structure communicating with the transverse opening, the conduit structure being connected by a first end to the supply body and extending laterally relative to the supply body and comprising a free end forming a discharge end comprising a discharge port for discharging a fluid at a nozzle outlet at the free end,
  the supply body and the conduit structure being comprised in a single block of a polymeric material, and
  wherein the discharge port is of a polygonal transverse cross-section at the nozzle outlet at the free end.

* * * * *